Dec. 18, 1962 B. O. VAN NESS 3,069,565

MULTIVIBRATOR HAVING INPUT GATE FOR STEERING TRIGGER PULSES TO EMITTER

Filed April 14, 1960

INVENTOR.
BRADFORD O. VAN NESS

BY Mueller & Aichele

ATTORNEYS

United States Patent Office 3,069,565
Patented Dec. 18, 1962

3,069,565

MULTIVIBRATOR HAVING INPUT GATE FOR STEERING TRIGGER PULSES TO EMITTER

Bradford O. Van Ness, Phoenix, Ariz., assignor to Motorola, Inc., Chicago, Ill., a corporation of Illinois Filed Apr. 14, 1960, Ser. No. 22,292
6 Claims. (Cl. 307—88.5)

Figure 1:
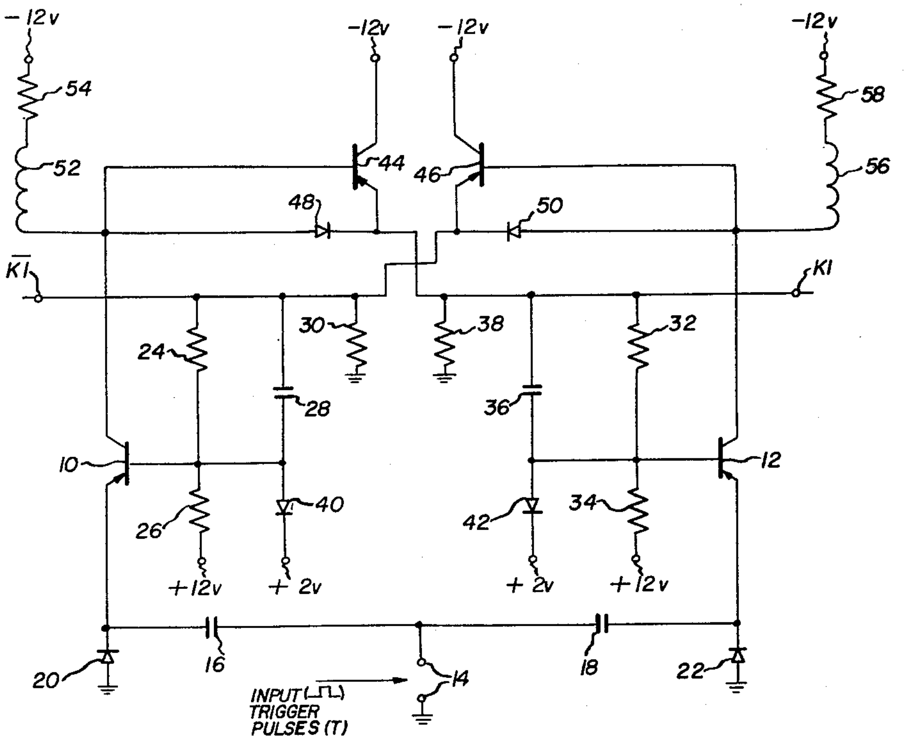

The present invention relates to bi-stable multivibrator circuits of the type commonly referred to in the electronic art as "flip-flop" networks; and it relates more particularly to improved transistorized multivibrators of the high speed type.

Bi-stable multivibrators may be used, for example, to store or remember the logic state of a given logic term; and they may also serve as registers for binary digits, or to function as a scale-of-two counter. In addition, a bank of mutually independent bi-stable multivibrators can be used as a register for the digits of a complete multi-digit binary number, or they may be coupled in cascade to form a counter of any desired number of different counter configurations.

Bi-stable multivibrators are widely used at present in electronic digital computers, and they are also used in other types of electronic or electrical apparatus. In fact, bi-stable multivibrator circuits find use in many switching applications in which the switch element is triggered "on" by a pulse and remains "on" after the pulse has been terminated and until a succeeding trigger pulse returns the switching element to its "off" condition.

It is usual for the bi-stable multivibrator to be provided with two output terminals. One of these output terminals, usually designated as the "true" output terminal, exhibits a particular voltage level when the multivibrator is in a first, or "true" stable state. The other output terminal, usually designated the "false" output terminal exhibits the particular voltage level when the multivibrator is in a second, or "false" stable state.

The bi-stable multivibrator circuit may be triggered between its true and false states by independent trigger signals applied to "true" or "false" input terminals of the bi-stable multivibrator. Alternately, the bi-stable multivibrator may be triggered from one stable state to another by successive trigger pulses applied to a common input terminal. The present invention is particularly concerned with the latter type of circuit, and with the provision of an improved diode steering circuit therein.

An example of a bi-stable multivibrator is the well known Eccles-Jordan bi-stable flip-flop. This flip-flop is a regenerative feedback configuration having two stable states. The bi-stable transistorized flip-flop usually employs common emitter coupling and is analogous to the well known cathode-coupled electron tube type Eccles-Jordan configuration.

It is often required in many types of installations that the bi-stable transistorized multivibrator be driven at a relatively high repetition rate which exceeds the $\alpha_e$ cut-off frequencies of the transistors. In general, three problems are encountered at the high frequencies. These are: (1) reliability of triggering; (2) frequency response limitations imposed by the transistors themselves; and (3) frequency response limitations imposed by the circuit configuration.

The present invention is mainly concerned with the solution of the reliability of triggering problem. The invention overcomes this problem by the provision of an improved diode gating or steering circuit in the bi-stable multivibrator. In accordance with the present invention the trigger pulses are introduced into the emitter circuits of the transistors forming the bi-stable amplifiers for the flip-flop. Such a system isolates the triggering pulses from the bi-stable feedback paths of the multivibrator.

Most prior art bi-stable multivibrators employ collector or base triggering of the transistors forming the multivibrators. In both cases, and regardless of the polarities of the triggering pulses, these pulses are also injected into the feedback paths of the flip-flop. For example, with PNP transistors, the following conditions obtain in the prior art circuits. It will be appreciated that like conditions obtain for NPN transistors with reverse trigger pulse polarity.

In the prior art case of collector circuit triggering and in the prior art case of base circuit triggering, and regardless of the polarity of the trigger pulses, each trigger pulse "sees" a conducting element and is also injected into the feedback path of the two bi-stable transistor amplifiers which make up the flip-flop. This injection is as follows:

(1) With collector circuit triggering and negative trigger pulses, each negative pulse sees the low collector-emitter impedance of the conducting transistor.

(2) With collector circuit triggering and positive trigger pulses, each trigger pulse sees the low base-emitter impedance of the conducting transistor through the corresponding speed up capacitor of the flip-flop.

(3) With negative trigger pulses and base circuit triggering, each trigger pulse sees the low collector-emitter impedance of the conducting transistor through the corresponding speed up capacitor.

(4) With positive trigger pulses and base circuit triggering, each trigger pulses sees the low base-emitter impedance from the base electrode of the conducting transistor.

Since the conditions outlined above exist for both collector and base triggering, any capacitive coupling, such as is required for differentiating an output from a previous flip-flop in a counter circuit, sees a partial short circuit at the initial portion of the trigger pulse. Therefore, in order to effect the required current transfer to change the state of the prior art multivibrator, relatively large capacitors are required to transfer sufficient energy. This is especially true when the trigger pulse rise time is sufficiently finite as to approach or exceed the transient response of the bi-stable multivibrator to be triggered.

The requirement for large capacitors in the prior art bi-stable multivibrator circuits, referred to in the preceding paragraph, introduces a serious problem in high speed bi-stable multivibrators wherein a low value of impedance must be maintained in the trigger capacitor discharge circuit, thereby producing an excessive load on the source of the triggering pulses. In high speed multivibrator requirements, for example, this prior art type of triggering produces problems in regard to inter-stage gating.

It is accordingly an object of the present invention to provide an improved high speed multivibrator in which the difficulties and problems discussed above are successfully overcome.

Another object of the invention is to provide such an improved high speed multivibrator in which the use in the trigger circuitry of capacitors of excessively high capacity is obviated, thus eliminating the above mentioned disadvantages attendant to the use of such high capacity capacitors.

A feature of the present invention is the provision of an improved high speed bi-stable multivibrator which includes an improved diode steering circuit for triggering purposes in the emitter circuits of the multivibrator amplifier transistors. This is so that the trigger pulses are introduced outside the stable feedback paths of the transistors.

Another feature of the invention is the provision of such an improved multivibrator in which the improved steering circuit is used in conjunction with junction type transistors having an "α" less than unity so that each transistor stage is in its stable state for improved bi-stable operation of the multivibrator.

Yet another feature of the invention is the provision of such an improved multivibrator in which the improved steering circuit effectuates a current control and is extremely simple in its construction, requiring for example a single capacitor and a diode for each transistor in the multivibrator circuit.

Figure 2:
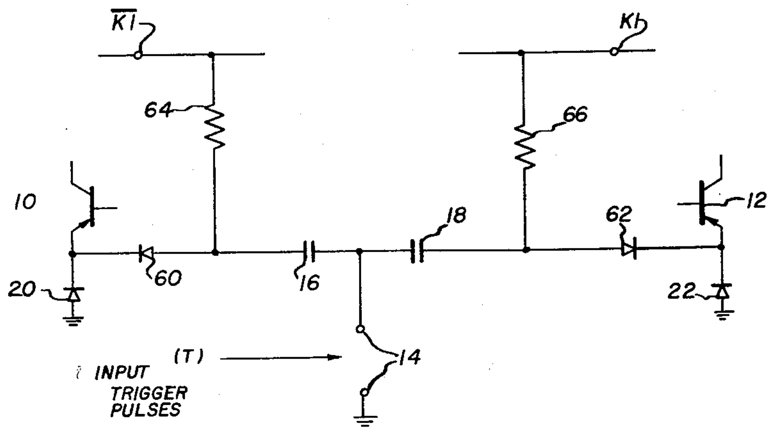

The above and other features of the invention which are believed to be new are set forth in the claims. The invention itself, together with further objects and advantages thereof, may best be understood by reference to the accompanying drawing in which:

FIGURE 1 is a circuit diagram of one embodiment of the improved transistorized bi-stable multivibrator of the present invention; and FIGURE 2 is a fragmentary diagram showing a modification to a portion of the circuit diagram of FIGURE 1.

The multivibrator circuit of FIGURE 1 includes a pair of transistors 10 and 12. These transistors may be of the PNP junction type, as presently designated 2N427. The circuit includes a pair of input terminals 14 which receive positive going input trigger pulses (T). One of the input terminals 14 is grounded, and the other is connected to a capacitor 16 and to a capacitor 18. Each of these capacitors may have a capacity of 110 micromicrofarads. The capacitor 16 is connected to the emitter of the transistor 10 and to the cathode of a diode 20. The capacitor 18 is connected to the emitter of the transistor 12 and to the cathode of a diode 22. The anode of the diode 20 and the anode of the diode 22 are both grounded. These diodes may be of the type presently designated 1N127A.

The base of the transistor 10 is connected to the junction of a resistor 24 and a resistor 26. The resistor 24 may have a resistance of 33 kilo-ohms, for example, and the resistor 26 may have a resistance of 100 kilo-ohms. The resistor 24 is shunted by a capacitor 28 which may have a capacity of 100 micro-microfarads. The resistor is connected to an output terminal designated $\overline{K1}$ and to a grounded resistor 30. The resistor 30 may have a resistance of 2 kilo-ohms, for example.

The base of the transistor 12 is connected to the junction of a resistor 32 and a resistor 34. The resistor 34 may have a resistance of 100 kilo-ohms, and that resistor and the resistor 26 may both be connected to the positive terminal of a 12 volt direct voltage source. The resistor 32 may have a resistance of 33 kilo-ohms, and it is shunted by a capacitor 36. The capacitor may have a capacity of 100 micro-microfarads. The resistor 32 is connected to an output terminal K1 of the multivibrator circuit, and the resistor 32 is also connected to a grounded resistor 38. The resistor 38 may have a resistance, for example, of 2 kilo-ohms.

A diode 40 has its anode connected to the base of the transistor 10, and the cathode of the diode is connected to the positive terminal of a 2 volt direct voltage source. The negative terminal of that source may be grounded. Likewise, a diode 42 has its anode connected to the base of the transistor 12, and the cathode of the latter diode is also connected to the positive terminal of the 2 volt direct voltage source. Each of these diodes may be of the type designated 1N127A.

The resistor 32 is also connected to the emitter of a PNP junction transistor 44, and the collector of the transistor 10 is connected to the base of that transistor. Likewise, the resistor 24 is also connected to the emitter of a transistor 46, and the collector of the transistor 12 is connected to the base of the latter transistor. The transistor 46 may also be of the PNP junction type, and the transistors 44 and 46 may be of the type designated 2N427.

A diode 48 has its base connected to the emitter of the transistor 44 and its anode connected to the base of the transistor 44. Likewise, a diode 50 has its base connected to the emitter of the transistor 46 and has its anode connected to the base of that transistor. These diodes may each be of the type designated 1N127A.

The collector of the transistor 10 is also connected to an inductance coil 52. This inductance coil may have an inductance of 100 microhenries, and it is connected to a resistor 54. The resistor 54 may have a resistance of 2 kilo-ohms, and it is connected to the negative terminal of the 12 volt direct voltage source. The collector of the transistor 44 is also connected to that negative terminal.

In like manner, the collector of the transistor 12 is connected to an inductance coil 56 which may have an inductance of 100 microhenries. The inductance coil 56 is connected to a resistor 58. The resistor 58 may have a resistance of 2 kilo-ohms, for example, and it is connected to the negative terminal of the 12 volt direct voltage source. The collector of the transistor 46 is also connected to that negative terminal.

The transistors 44 and 46 are connected in known manner to constitute emitter follower buffer stages. These stages serve to prevent overloading of the amplifier flip-flop transistors 10 and 12 in the presence of heavy load conditions.

The positive going trigger pulses T introduced to the input terminals 14 successively trigger the flip-flop between a first stable operating condition and a second stable operating condition. When the flip-flop is in its first stable operating condition, the transistor 12 is conductive, and the output terminal K1 is at a value corresponding to "0" or ground potential. During this first stable operating condition, the transistor 10 is non-conductive, and the output terminal $\overline{K1}$ is at essentially −12 volts.

Conversely, during the second stable operating condition, the transistor 10 is conductive and the transistor 12 is non-conductive. This latter stable operating condition establishes the output terminal K1 at essentially −12 volts and establishes the output terminal $\overline{K1}$ at essentially 0 volts. The output terminal K1 may be considered the "true" output terminal of the bistable multivibrator circuit, and the output terminal $\overline{K1}$ may be considered the "false" output terminal of the multivibrator.

The trigger pulse steering circuit for the multivibrator of FIGURE 1 includes the diodes 20 and 22, and the capacitors 16 and 18 in the emitter circuit of the voltage amplifier transistors 10 and 12. It is immediately apparent that the trigger input pulses are isolated from the multivibrator feedback paths, so that the prior art conditions described above are not encountered.

Assuming now that the multivibrator circuit is in its first stable operating condition, in which the transistor 12 is conductive, and the transistor 10 is non-conductive, the next succeeding positive going input trigger pulse applied to the input terminals 14 is introduced to two divergent paths at the junction of the capacitors 16 and 18.

The part of the trigger pulse energy taking the right hand path will terminate at the diode 22 in the emitter circuit of the transistor 12. This diode is in a conductive state because of the current flow through the transistor 12, and the energy of the portion of the trigger pulse applied to that diode will, therefore, be dissipated within the low forward impedance of the diode. However, the portion of the positive going trigger pulse introduced to the left hand path will initially terminate in an open circuit. This is because the transistor 10 is in the non-conductive state, and the positive going trigger voltage is of the opposite polarity to that required for conduction of the diode 20 in the emitter circuit of the transistor 10. Therefore, the voltage at the emitter of the transistor 10 will rise in a positive direction until that transistor begins to conduct. When such conduction occurs, the bi-stable regenerative process in the circuit intercoupling the base and collector electrodes of the transistors 10 and 12 will continue to change the states of the transistors 10 and 12. As the transistor 10 becomes conductive, the diode 20 will also become conductive and thereby provide a low impedance path to ground for the remaining part of the portion of the trigger pulse applied to the emitter of the transistor 10.

The action described above causes the state of the multivibrator circuit of FIGURE 1 to change in response to the positive going trigger pulse introduced to the input terminals 14. When the two transistors 10 and 12 have changed state, the next positive trigger pulse introduced to the input terminals 14 will cause the transistor 12 to become conductive and thus restore the multivibrator circuit to its original state. Therefore, successive positive going trigger pulses introduced to the input terminals 14 cause the multivibrator of FIGURE 1 to be successively triggered from one of its stable states to the other. Any negative going trigger pulses will be short circuited by both the diodes 20 and 22 in the circuit of FIGURE 1, because of the illustrated polarity of those diodes.

Because the particular steering circuit incorporated in the multivibrator of FIGURE 1 is complementary and self-steering, it is important that the duration of the individual trigger pulses be equal or less than the response time of the multivibrator circuit to prevent ghost triggering, whereby multiple changes of state are produced by a single trigger pulse. It is also important that the source of the input trigger pulses (T) be of sufficiently low impedance to permit the loss of energy in the conducting side of the multivibrator circuit without completely attenuating the voltage introduced to the non-conducting side.

For applications in which the source of trigger pulses does not have sufficient low impedance for the purposes described above, or in which the duration of the individual trigger pulses is relatively long, a portion of the circuit in FIGURE 1 may be modified in the manner shown in FIGURE 2. This modification is such that the flow of a portion of a triggering pulse to the conducting side of the multivibrator circuit, with the attendant loss of energy due to that flow, is prevented. Also, a proper choice of resistance-capacitance values in the circuit of FIGURE 2 will prevent ghost triggering by the relatively wide trigger pulses.

In the embodiment of FIGURE 2, a diode 60 is interposed between the capacitor 16 and the diode 20, and a diode 62 is interposed between the capacitor 18 and the diode 22. The diode 60 has its cathode connected to the emitter of the transistor 10 and has its anode connected to the capacitor 16. Likewise, the diode 62 has its cathode connected to the emitter of the transistor 12 and has its anode connected to the capacitor 18. A resistor 64 is connected to the output terminal $\overline{K1}$ and to the anode of the diode 60. A resistor 66 is connected to the output terminal K1 and to the anode of the diode 62.

In the steering circuit of FIGURE 2, the diode 62 blocks the introduction of a portion of a trigger pulse to the emitter circuit of the transistor 12 when that transistor is conductive. The diode 60, in like manner, blocks the introduction of a portion of a trigger pulse into the emitter circuit of the transistor 10 when the latter transistor is conductive. Therefore, the resulting attenuation of these pulses of the trigger pulses is prevented. Also, the value of the resistors 64 and 66 is selected with respect to the value of the capacitors 16 and 18, so that the resulting resistance-capacity networks have a sufficiently long time constant to prevent multiple triggering of the multivibrator in response to any one trigger pulse, even though that trigger pulse has a relatively long duration.

The invention provides, therefore, an improved high speed bi-stable transistorized multivibrator circuit which is constructed to incorporate an improved trigger pulse steering circuit to provide triggering reliabilities at relatively high triggering frequencies. Moreover, the improved high speed multivibrator circuit is constructed so that the load placed on the source of the triggering pulses is not excessive and the use of excessively high capacity values in the trigger circuitry is obviated.

The improved bi-stable multivibrator of the invention incorporates diode steering circuitry which is extremely simple in its construction, and by which the trigger pulses are introduced outside the bi-stable regenerative feedback paths of the multivibrator circuit.

I claim:

1. A bi-stable transistorized multivibrator circuit in combination: a first transistor and a second transistor each having a base electrode and an emitter electrode and a collector electrode, first coupling means coupling the base electrode of the first transistor to the collector electrode of the second transistor and including first resistance means, second coupling means for coupling the base electrode of the second transistor to the collector electrode of the first transistor and including second resistance means, first and second input terminals for receiving trigger signals to successively trigger the multivibrator circuit between a first stable state and a second stable state, said second input terminal being connected to a point of reference potential, first and second capacitor means connected to said first input terminal, first diode means connected to said first capacitor means and to said emitter electrode of the first transistor, second diode means connected to said second capacitor means and to the emitter electrode of the second transistor, third diode means connected to the emitter electrode of the first transistor and to said point of reference potential, fourth diode means connected to the emitter electrode of the second transistor and to said point of reference potential, a first output terminal connected to said first coupling means, resistance means connected to the junction of said first capacitor means and to said first diode means and to said first output terminal, a second output terminal connected to said second coupling means, and further resistance means connected to the junction of said second capacitor means and said second diode means and to said second output terminal.

2. A bi-stable transistorized multivibrator circuit including in combination: a first PNP junction transistor and a second PNP junction transistor each having a base electrode and an emitter electrode and a collector electrode, first coupling means connected to the base electrode of the first transistor and to the collector electrode of the second transistor and including first resistance means, second coupling means connected to the base electrode of the second transistor and to the collector electrode of the first transistor and including second resistance means, first and second input terminals for receiving positive going trigger pulses for successively triggering the multivibrator circuit between a first stable state and a second stable state, said second input terminal being connected to a point of reference potential, first and second capacitor means connected to said first input terminal, a first diode having an anode connected to said first capacitor means and having a cathode connected to said emitter electrode of the first transistor, second diode means having an anode connected to said second capacitor means and having a cathode connected to the emitter electrode of the second transistor, third diode means having a cathode connected to the emitter electrode of the first transistor and having an anode connected to the point of reference potential, fourth diode means having a cathode connected to the emitter electrode of the second transistor and having an anode connected to said point of reference potential, a first output terminal, resistance means connected to the anode of said first diode and to said first output terminal, a second output terminal, and further resistance means connected to the anode of said second diode and to said second output terminal.

3. A bistable transistorized multivibrator circuit including in combination: a first transistor and a second transistor each having respective base, emitter and collector electrodes, first coupling means including an emitter follower circuit with a third transistor having a base connected to said collector electrode of said first transistor and an emitter connected to said base electrode of said second transistor, second coupling means including an emitter follower circuit with a fourth transistor having a base connected to said collector electrode of said second transistor and an emitter connected to said base electrode of said first transistor, respective impedances connected to said collector electrodes of said first and second transistors, output circuit means including further impedances connected from said emitters of said third and fourth transistors to a reference point, an input circuit for receiving trigger signals for successively triggering said multivibrator circuit between a first stable state and a second stable state, a first capacitor connected between said input circuit and said emitter electrode of said first transistor, a second capacitor connected between said input circuit and said emitter electrode of said second transistor, a first diode connected to said emitter electrode of said first transistor to a point of reference potential, and a second diode connected to said emitter electrode of said second transistor and to the point of reference potential.

4. The combination of claim 3 including a parallel connected resistor capacitor connected between said emitter of said third transistor and said base electrode of said second transistor, and a further parallel connected resistor capacitor connected between said emitter of said fourth transistor and said base electrode of said first transistor.

5. The combination of claim 3 including first and second diodes connected respectively between said base electrodes of said first and second transistors and a source of bias potential.

6. The combination of claim 3 including respective diodes connected between said bases and emitters of said third and fourth transistors.

References Cited in the file of this patent

UNITED STATES PATENTS

| | | |
|---|---|---|
| 2,903,676 | Ostendorf | Sept. 8, 1959 |
| 2,920,216 | Brauer | Jan. 5, 1960 |
| 2,939,969 | Kwap | June 7, 1960 |
| 2,976,432 | Geckle | Mar. 21, 1961 |

FOREIGN PATENTS

| | | |
|---|---|---|
| 563,407 | Canada | Sept. 16, 1958 |